United States Patent
Araki et al.

(10) Patent No.: US 6,930,805 B2
(45) Date of Patent: Aug. 16, 2005

(54) IMAGE READING APPARATUS

(75) Inventors: Tomoyuki Araki, Shizuoka (JP);
Yasuyoshi Hayakawa, Shizuoka (JP);
Tsuyoshi Waragai, Shizuoka (JP);
Atsushi Ogata, Shizuoka (JP);
Masayoshi Fukatsu, Shizuoka (JP);
Junichi Sekiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 09/881,703

(22) Filed: Jun. 18, 2001

(65) Prior Publication Data

US 2002/0044309 A1 Apr. 18, 2002

(30) Foreign Application Priority Data

Jun. 22, 2000 (JP) ........................................ 2000-187356

(51) Int. Cl.$^7$ ................................................. H04N 1/04
(52) U.S. Cl. ........................ 358/496; 358/408; 358/498; 358/497; 358/474; 399/367; 399/374
(58) Field of Search ................................. 358/496, 408, 358/498, 497, 475, 509, 474, 505, 401, 483, 482, 473, 472, 471, 506, 487; 399/374, 380, 367, 369, 364, 92, 95, 114, 107, 110; 250/234–236, 208.1; 382/312, 318, 319, 313; 355/24, 23; 347/107, 108

(56) References Cited

U.S. PATENT DOCUMENTS 6,172,774 B1 * 1/2001 Yamashita .................. 358/474
6,661,543 B1 * 12/2003 Morita ....................... 358/498

* cited by examiner

Primary Examiner—Cheukfan Lee
(74) Attorney, Agent, or Firm—Fitzpatrick, Cella, Harper & Scinto

(57) ABSTRACT

An object of the present invention is to provide an image reading apparatus that has first reading device for reading a first surface of an original, and second reading device for reading a second surface opposite to the first surface of the original, the first reading device and the second reading device being provided on the first surface side and the second surface side, respectively, with the original as a boundary, the second reading device including a light source and a reading member for reading image light from the original irradiated by the light source, the reading member being provided separately from a vertical line passing through the light source.

3 Claims, 6 Drawing Sheets

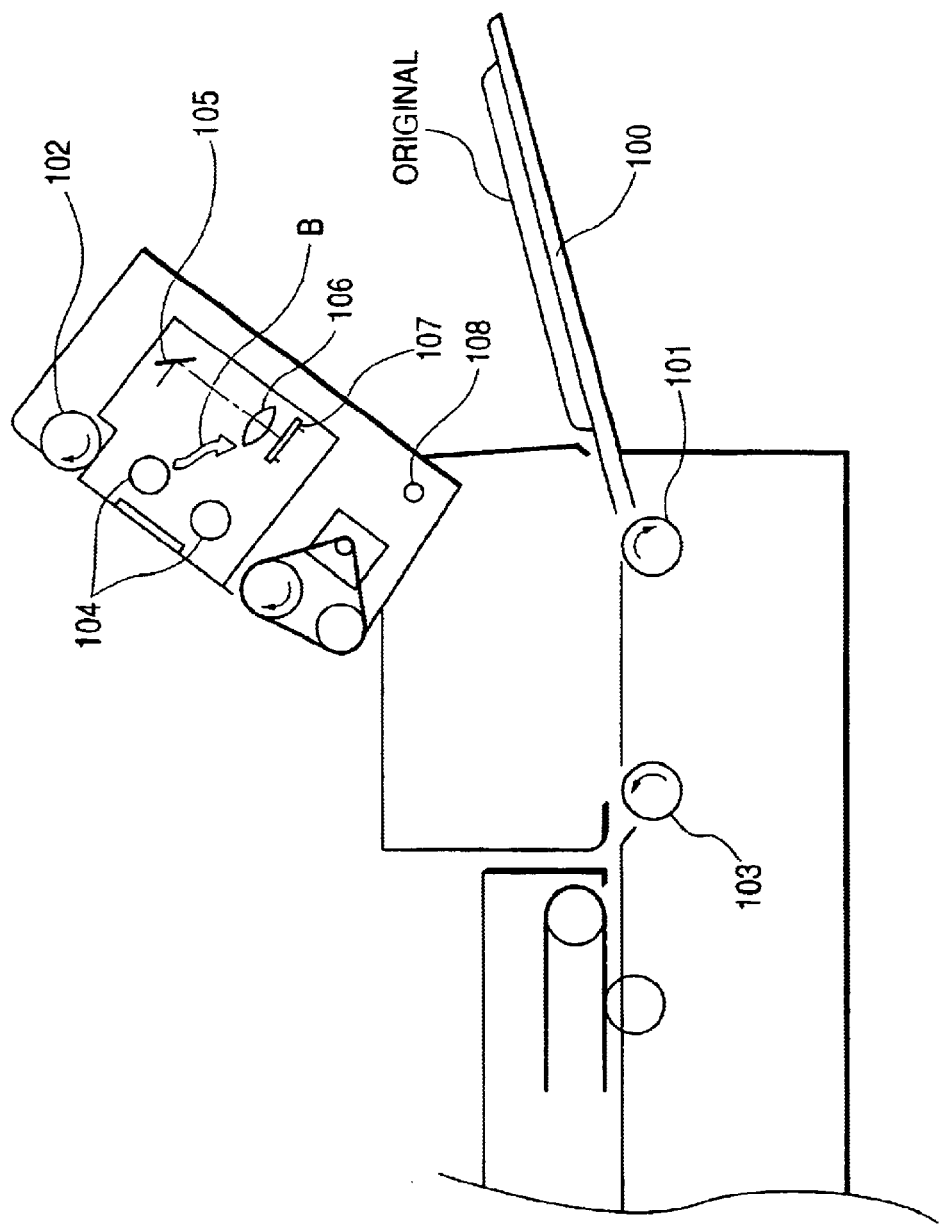

IMAGE READING APPARATUS

BACKGROUND OF THE INVENTION

1. Field of the Invention

This invention relates to an image reading apparatus provided with a reading member such as a CCD and for reading the image of an original.

2. Related Background Art

FIGS. 5 and 6 of the accompanying drawings show an image reading apparatus which is the background art of the present invention. This apparatus is an apparatus in which an original is moved and the image of the both sides of the original are read, and has first image reading means for reading the lower surface of the original, and second image reading means for reading the upper surface of the original, and can read the images of the both sides of the original at a time. When sides is to be effected, the original is automatically fed with the first image reading means fixed, and lights are applied from discrete light sources to the both sides of the original being conveyed, and the reflected lights are received and the images are read.

As shown in FIG. 5, the original placed on an original stacking plate 100 is pulled into the apparatus by a pulling-in portion. The pulled-in original is moved by a separating roller 101, a discharge roller 102 and a driven roller 103. In the meantime, the front surface of the original is illuminated by a lamp 104, and the optical information of the original is directed to a lens 106 by a mirror 105. The lens 106 converges the optical information of the original and applies it to a CCD 107. The optical information which has entered the CCD 107 is converted into an electrical signal and as the result, the information of the front surface of the original is read by the CCD.

Further, design is made such that when jam occurs during the conveyance of the original, a reading unit can be pivotally moved about a hinge 108 to open a portion of a conveying path so that a user can smoothly carry out jam treatment (see FIG. 6).

Now, when the light is applied from the light source, heat is generated from the light source and the temperature in the apparatus rises. Particularly when the upper surface of the original is to be read, the upper portion of the apparatus in which the temperature is liable to rise is liable to be affected by the heat thereof because as a matter of course, the reading means is disposed above the original.

Also, in the trend to a higher speed and a higher quality of image, the temperature rise of the light source lamp has become great. As indicated by arrows A in FIG. 5, heated air moves upward and therefore, the temperature of the CCD which is an image reading member disposed above the light source rises and thus, there has been the possibility that the image cannot be read with good accuracy or in the case of a CCD capable of reading a color image, the gelatin matter of a color filter melts out and an inconvenience may occur to the CCD.

Also, while as shown in FIG. 6, a reading unit for reading the upper side of the original including an original upper side conveying path is pivotally moved to thereby open the conveying path and carry out jam treatment and maintenance, there is a case where paper powder and toner adhering to the conveying path or stripped-off toner and dust fall off the conveying path with the pivotally moving operation and fall downward as indicated by arrow B in FIG. 6. If at this time, the CCD is at a short distance from the center of pivotal movement, the CCD may be located below the locus of the pivotal movement of the conveying path and therefore, it has sometimes happened that the CCD is stained by the falling paper powder, toner and dust and the image of the original cannot be read accurately.

SUMMARY OF THE INVENTION

It is an object of the present invention to provide an image reading apparatus in which a reading member is prevented from rising in temperature by the heat of a light source.

It is another object of the present invention to provide an image reading apparatus in which dust or the like is prevented from adhering to a reading member during the movement of a reading unit.

It is still another object of the present invention to provide an image reading apparatus comprising first reading means for reading a first surface of an original, and second reading means for reading a second surface opposite to the first surface of the original, the first reading means and the second reading means being provided on the first surface side and the second surface side, respectively, with the original as the boundary, the second reading means including a light source and a reading member for reading image light from the original irradiated by the light source, the reading member being provided separately from a vertical line passing through the light source.

It is yet still another object of the present invention to provide an image reading apparatus comprising a unit for reading an original being conveyed, the unit having a reading member for reading image light from the original, and being openable and closable relative to the main body of the apparatus with an original conveying path as the boundary, wherein when the unit is opened, the reading member is located above that portion of the unit which forms the original conveying path.

Further objects of the present invention will become apparent from the following description.

BRIEF DESCRIPTION OF THE DRAWINGS

FIG. 6 shows a reading unit as it is opened.

DESCRIPTION OF THE PREFERRED EMBODIMENTS

Some embodiments of the present invention will hereinafter be described with reference to the drawings.

Figure 1:
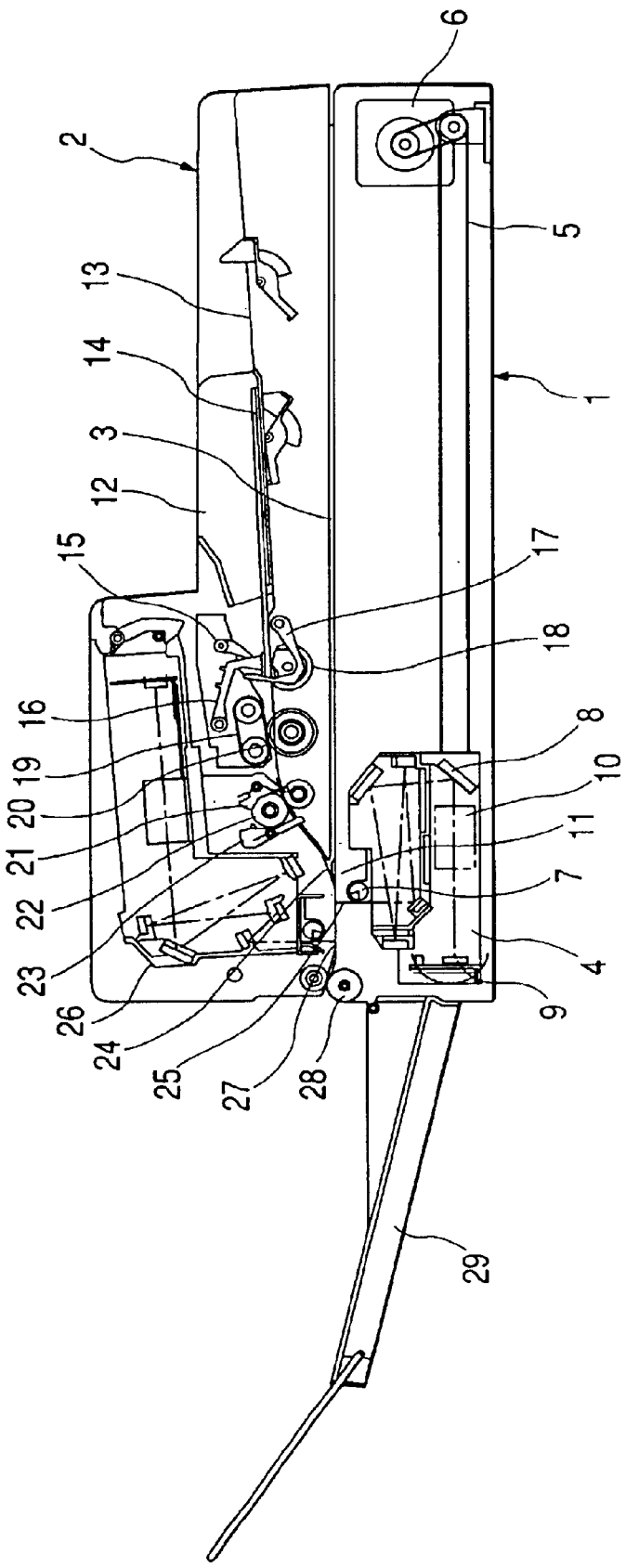
FIG. 1 shows an image reading apparatus which is an embodiment of the present invention.
Figure 2:
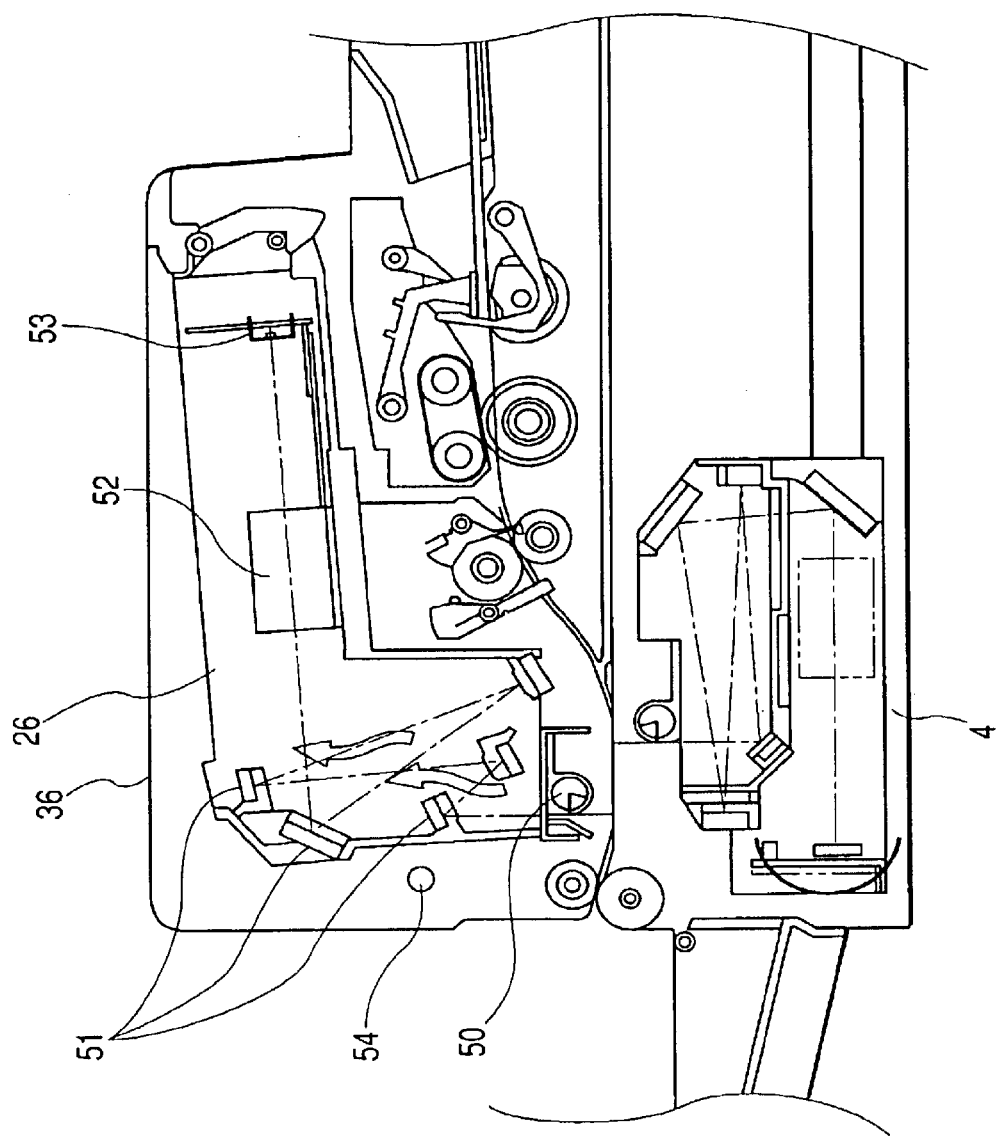
FIG. 2 shows reading means and the surroundings thereof.

FIG. 1 shows an image reading apparatus which is an embodiment of the present invention, and FIG. 2 shows reading means and the surroundings thereof.

The reference numeral 1 designates a flat bed image reading portion (FB) capable of fixing an original thereon and reading the image of the original, and the reference numeral 2 denotes an ADF (automatic document feeder) mounted on the upper surface of the FB1, and this is a device for feeding and conveying original stacked thereon one by one to a predetermined reading portion.

The reference numeral 3 designates an original glass plate, the reference numeral 4 denotes an optical carriage (a lower surface side optical reading unit) which is first reading means for scanning the original on the original glass plate 3, the reference numeral 5 designates a driving belt for drive transmission for moving the carriage 4, the reference numeral 6 denotes a carriage driving motor for driving the driving belt 5, the reference numeral 7 designates a lamp which is a light source disposed on the upper surface of the carriage 4, the reference numeral 8 denotes a reflecting mirror for directing reflected light reflected from the original by the lamp to a predetermined optical path, the reference numeral 9 designates a CCD which is a reading member (a reading device or a reading element) for converting an image obtained by receiving the light directed by the reflecting mirror 8 into an electrical signal, the reference numeral 10 denotes a condensing lens for condensing the light reflected by the reflecting mirror 8 onto the CCD, the reference numeral 11 designates an original dashing reference plate provided on the original glass plate 3, the reference numeral 12 denotes an original side regulating plate provided on the ADF 2 for effecting the widthwise regulation of the sheet, the reference numeral 13 designates an original stacking tray the reference numeral 14 denotes an original length detecting lever disposed on the original stacking tray 13 for detecting the lengths of the originals, the reference numeral 15 designates an original presence or absence sensor lever for detecting the leading end of the original and detecting the presence or absence of the original, the reference numeral 16 denotes a weight for holding down the leading end of the original from above it, the reference numeral 17 designates an original shutter for preventing the leading end of the original from coming into a separating and feeding portion, the reference numeral 18 denotes a feeding pickup roller for feeding the stacked originals in succession from the lowermost one, the reference numeral 19 designates a separating belt rotatively driven in the direction opposite to the conveying direction of the original, the reference numeral 20 denotes a feed roller provided in opposed relationship with the separating belt 19, the reference numeral 21 designates a pre-registration sensor lever for detecting the leading end of the original and taking the timing for making the loop of the original, the reference numeral 22 denotes a pair of registration rollers, the reference numeral 23 designates an original leading end detecting lever for detecting the leading end of the original conveyed by the registration rollers, and the reference numeral 24 denotes an original conveying upper guide provided in opposed relationship with the original glass plate 3 for causing the originals to be conveyed with the aid of a predetermined gap provided between the original glass plate 3 and the original conveying upper guide and the images thereof to be read. The reference numeral 25 designates a first reading point for reading one side of the original by the carriage 4, and the reference numeral 26 denotes an optical carriage (an upper surface side optical reading unit) which is second reading means provided at a location opposed to the carriage 4 with the original interposed therebetween, and in the carriage 26, there are disposed a reflecting mirror 51 and a CCD 53 similar to those in the carriage 4. The reference numeral 27 designates a second reading point for reading the image of one side of the original by the carriage 26, the reference numeral 28 denotes a pair of discharge rollers for discharging the originals out of the apparatus, and the reference numeral 29 designates a discharge tray for stacking thereon the originals discharged by the pair of discharge rollers 28.

Figure 3:
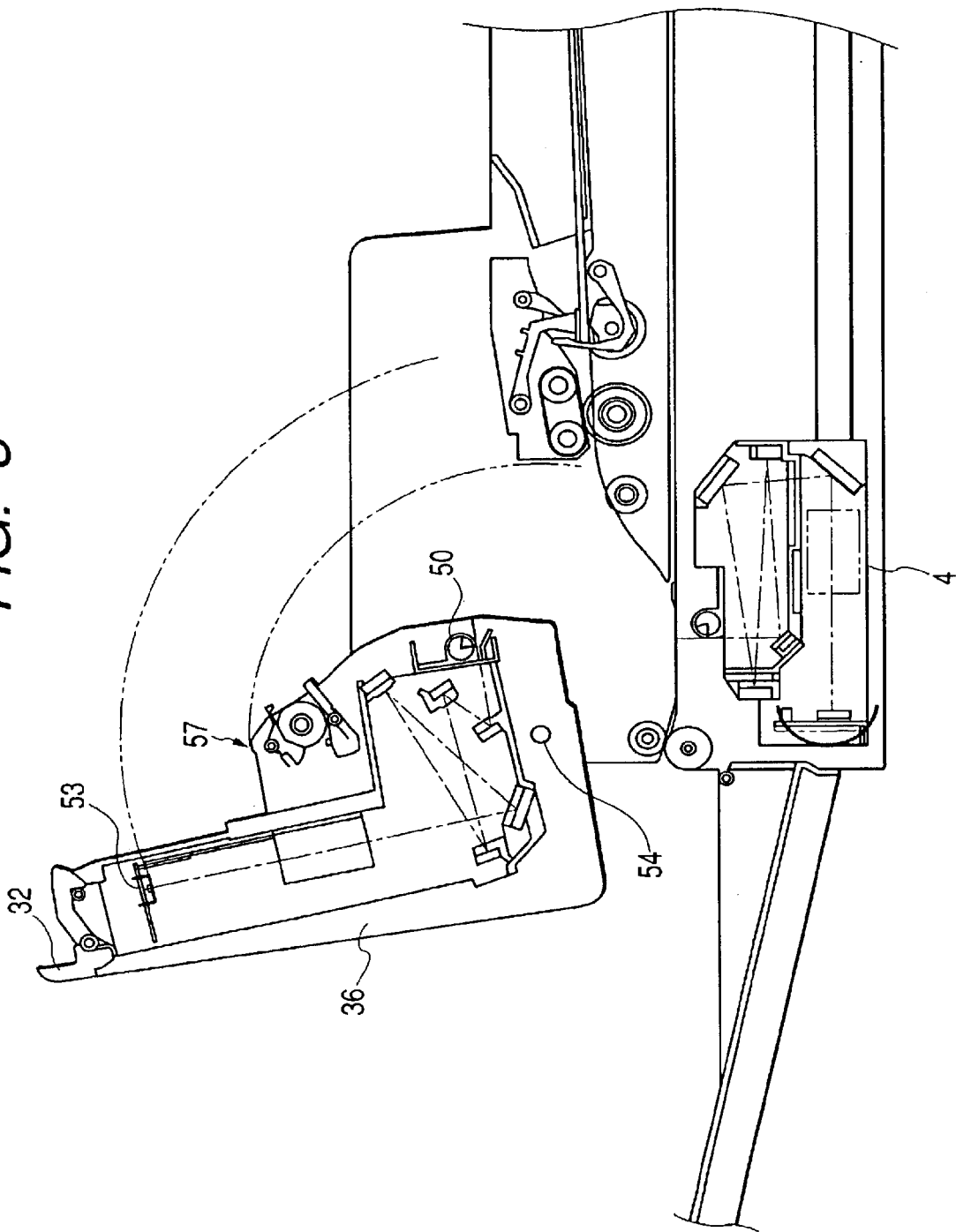
FIG. 3 shows a reading unit as it is opened.

FIG. 3 shows the opened portion of the ADF 2 during jam treatment, and in FIG. 3, the reference numeral 32 denotes a jam treating lever, and the reference numeral 36 designates an ADF jam opening and closing portion adapted to be opened when a jammed original is to be removed. The opening and closing portion 36 is a reading unit containing the second reading means 26 a frame member. The reading unit is openable and closable relative to the main body of the apparatus with the original conveying path as the boundary.

FIG. 2 is an enlarged view for illustrating in detail the reading unit for reading the image of the upper surface of the original.

The reference numeral 50 designates a lamp (an upper surface side light source) for applying light to the upper surface side of the original, and the reflected light from the upper surface of the original by the irradiation by the lamp 50 is directed to a predetermined optical path by a reflecting mirror 51. The light directed by the reflecting mirror 51 then passes through a condensing lens 52 and is condensed onto a CCD (an upper surface side image reading member) 53 which is an image reading member. When the image of the upper surface of the original is to be read, the irradiating lamp 50 applies light thereto and begins to generate heat. The air around the irradiating lamp 50 is heated and moves to above the lamp, and the members and air above it rise in temperature. However, in the embodiment to which the present invention is applied, the CCD 53 is disposed at a location deviating from substantially vertically above the lamp 50, i.e., a location horizontally separate from a vertical line passing through the lamp 50 at an upper position in the vertical line. Therefore, the temperature of the CCD which is an image reading member is not affected by the temperature rise of the lamp 50 and can effect stable image reading.

FIG. 3 further shows a case where the opening of the ADF 2 for jam treatment has been effected. The distance from the hinge 54 which is the pivot to the CCD 53 is longer than the locus of the pivotal movement of the portion 57 of the reading unit which forms an original conveying path and the CCD 53 is located substantially in the same direction as the pivotally moved conveying path forming portion 57 as viewed from the pivot hinge 54 and more adjacent to the opened side than the pivotally moved conveying path forming portion 57 and therefore, the CCD 53 is always located at a position above the conveying path forming portion 57 in the locus of the pivotal movement thereof. That is, when the reading unit (the opening and closing portion) 36 is opened, the reading member 53 is located above the portion 57 of the unit 36 which forms the original conveying path. Therefore, when the reading unit is pivotally moved for jam treatment or maintenance, paper powder and toner and dust stripped off the original ball to the side opposite to the CCD 53 and thus, the reading member 53 is not stained.

Figure 4:
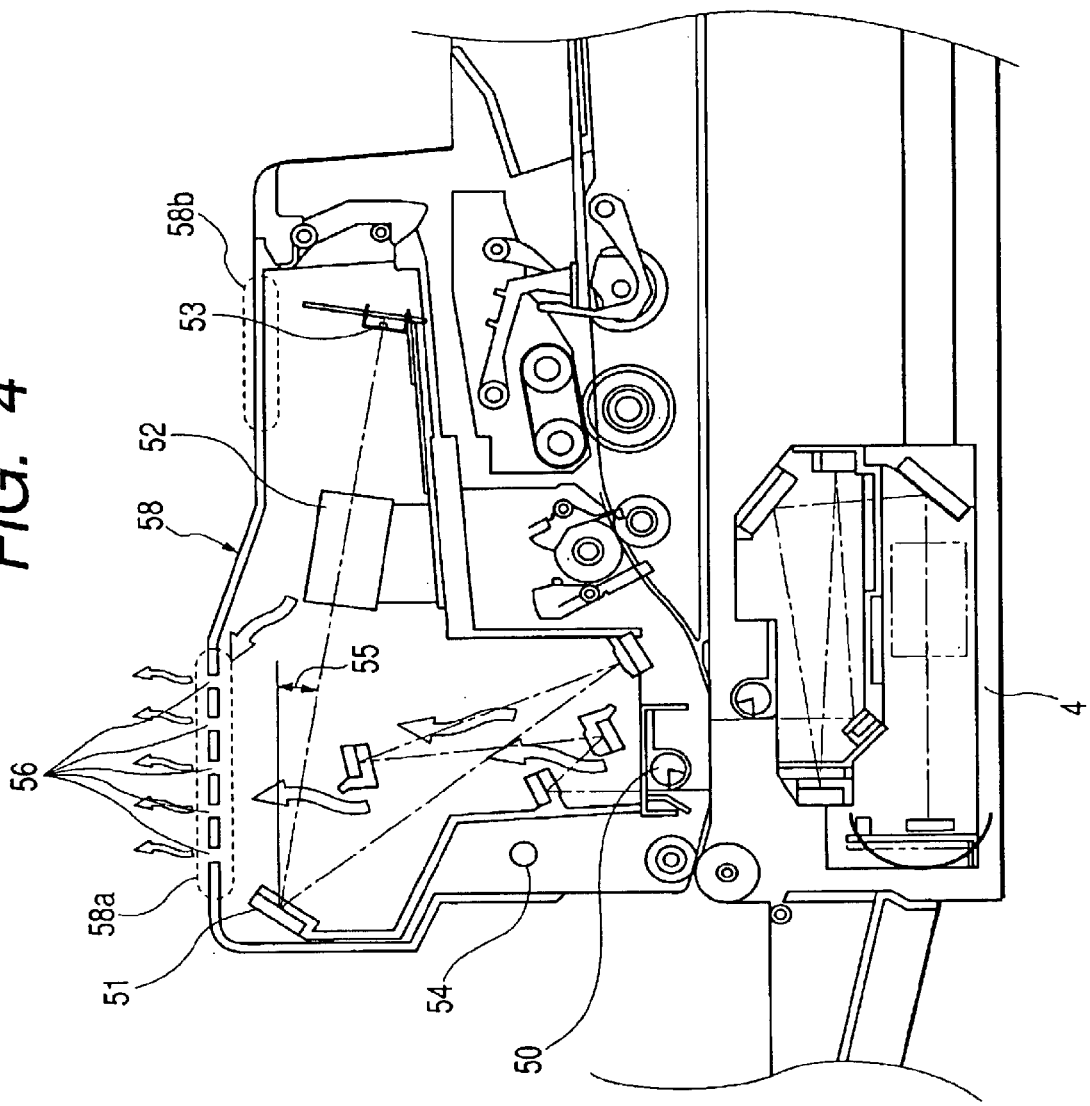
FIG. 4 shows the reading means of an image reading apparatus which is another embodiment of the present invention and the surroundings thereof.
Figure 5:
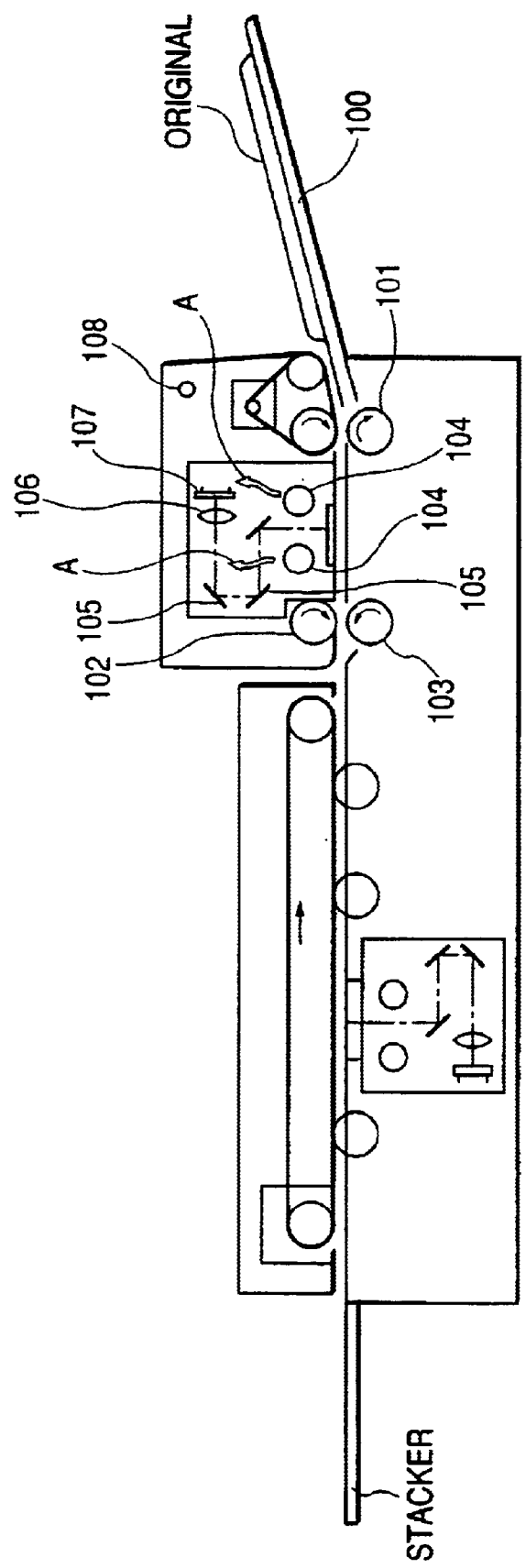
FIG. 5 shows an image reading apparatus which is the background art of the present invention.

FIG. 4 is a view for illustrating another embodiment. In this embodiment, members similar to those in the aforedescribed embodiment are given similar reference numerals and need not be described.

The reference numeral 50 designates a lamp for applying light to the upper surface side of the original, and the reflected light from the upper surface of the original by the irradiation by the lamp 50 is directed to a predetermined optical path by a reflecting mirror 51. The light directed by the reflecting mirror 51 then passes through a condensing lens 52 and is condensed onto a CCD 53 which is an image reading member. The reference numeral 58 denotes a cover for covering the lamp 50, the CCD 53, etc. When the image of the upper surface of the original is to be read, the irradiating lamp 50 applies light thereto and begins to generate heat. The air around the irradiating lamp is heated and moves to above the lamp, and the members and the air above it rise in temperature. In the present embodiment, however, a ceiling surface (light source ceiling portion) 58*a* which is a first cover portion above the lamp 50 is higher than a ceiling surface (reading member ceiling portion) 58*b* which is a second cover portion on the CCD 53 side. Therefore, the air heated by the lamp 50 and having come up does not flow to the CCD side, but collects below the ceiling on the lamp 50 side. Of course, again in the present embodiment, the reading member 53 is horizontally separate from the vertical line passing through the lamp 50, and the temperature rise of the reading member 53 can be prevented.

Further, in the present embodiment, an opening portion 56 is formed in the ceiling (the first cover portion 58*a*) on the lamp 50 side. The hot air collected as shown in FIG. 4 is exhausted outwardly through the exhaust opening 56 and therefore, it is more difficult for the temperature of the CCD 53 which is an image reading member to be affected by the temperature rise of the lamp 50 than in the aforedescribed embodiment, and more stable reading can be effected.

As described above, according to the present invention, the temperature rise of the image reading member such as the CCD by the heat generation of the light source can be suppressed, and it is possible to avoid the trouble due to the temperature rise by high-speed reading. Also, for example, the gelatin matter of the color filter of the CCD can be prevented from being melted.

Also, even when the optical reading unit is pivotally moved to open the original conveying path during jam treatment, the image reading member is always located above the original conveying path forming portion. Therefore, paper powder, dust, etc. do not fall and come into the image reading portion, and stale and accurate image reading is possible.

While the embodiments of the present invention have been described above, the present invention is not restricted to the above-described embodiments, but all modifications are possible within the technical idea of the present invention.

What is claimed is:

1. An image reading apparatus comprising:

a main body;

an original feeding unit mounted on said main body;

first reading means for reading a lower face of an original, said first reading means being located in said main body below a path along which an original is fed by said original feeding means; and second reading means for reading an upper face of the original, said second reading means being located in said original feeding unit, wherein said second reading means includes a light source and a reading member for reading image light from the original irradiated by said light source, said reading member being spaced from a vertical line passing through said light source, wherein said original feeding unit includes a cover for covering said second reading means, a first portion of said cover being disposed over said reading member and a second portion of said cover being disposed over said light source at a level higher than said first portion thereof, and wherein said second cover portion has an opening therein for exhaust of hot air.

2. An image reading apparatus according to claim 1, wherein said second reading means is movable with respect to said main body for being opened to expose said conveying path, and when said second reading means is opened, said reading member is located above a portion of said second reading means which forms the original conveying path.

3. An image reading apparatus according to claim 2, wherein said second reading means is pivotally movable about a fulcrum.

* * * * *